F. KUHN.
ELECTRIC HEATER.
APPLICATION FILED APR. 5, 1912.

1,087,592.

Patented Feb. 17, 1914.

Witnesses
H. K. Ford
James P. Barry

Inventor
Frank Kuhn
By Whittemore Hulbert & Whittemore
attys.

UNITED STATES PATENT OFFICE.

FRANK KUHN, OF DETROIT, MICHIGAN.

ELECTRIC HEATER.

1,087,592.  Specification of Letters Patent.  Patented Feb. 17, 1914.

Application filed April 5, 1912. Serial No. 688,601.

*To all whom it may concern:*

Be it known that I, FRANK KUHN, a citizen of the United States of America, residing at Detroit, in the county of Wayne and State of Michigan, have invented certain new and useful Improvements in Electric Heaters, of which the following is a specification, reference being had therein to the accompanying drawings.

The invention relates to electric heaters designed for attachment to cooking utensils and more particularly for the heating of coffee urns and for similar uses, and the invention consists in the construction as hereinafter set forth.

Figure 1:
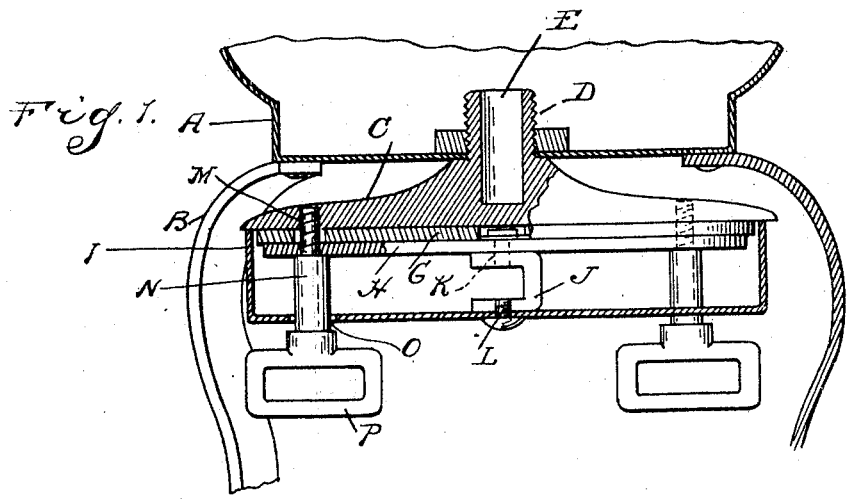
Figure 2:
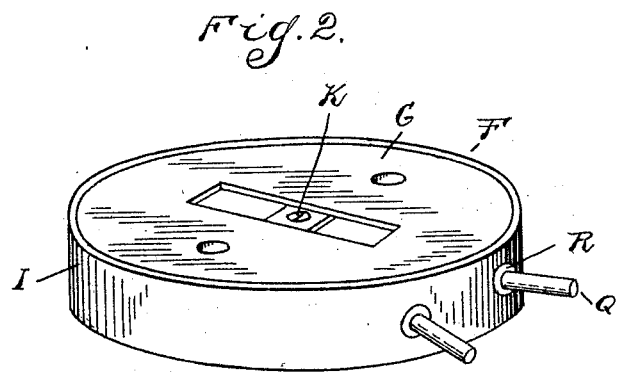
Figure 3:
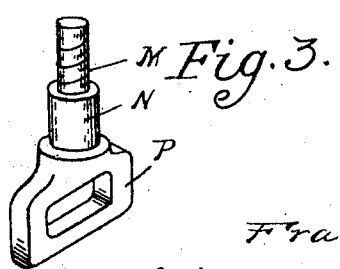

In the drawings, Figure 1 is a vertical central section through the heater as applied to a coffee urn of the percolator type; Fig. 2 is a perspective view of the heating unit detached. Fig. 3 is a perspective view of the thumb-screw.

A is an urn or vessel containing the material to be heated and is supported on suitable standards such as B.

C is a heat receiving and distributing body which is secured to the bottom of the urn or vessel and is suspended therefrom. With the construction shown which is designed for a percolator, the member C is provided with an upwardly extending nipple D which passes into the interior of the vessel and has formed therein the well or chamber E in which the fluid is brought to the boiling point. The lower face of the body C is extended to provide a relatively large area for receiving heat from the heating unit, and as shown, this face is of larger diameter than the bottom of the urn and extends into proximity to the standards B without being in heat conducting contact therewith. The body of the member C also preferably tapers from a thin marginal portion to a greater thickness at the center so as to provide a constantly increasing cross section for the molecular conduction of heat from the lower surface to the walls of the well E.

The electrical heater F is arranged to be clamped in contact with the member C and consists of an armored disk unit G, a backing plate H beneath the same, and a casing I for inclosing said disk and plate and supported therefrom to form an air space. The disk G and plate H are of slightly lesser diameter than the member C as is also the casing I, so that said member C forms a cover for the case preventing the accidental spilling of fluid therein. The casing I is suspended by a spacer J which is connected by a screw K to the unit G and plate H, and by a screw L to the bottom of the casing. For clamping the unit in firm heat conducting contact with the lower face of the member C, shoulder screws M are provided having shanks N beyond the shoulder of a length greater than the height of the casing I and which pass through apertures O in the bottom thereof. These screws are preferably provided with finger grips P for tightening or loosening the same.

In use, the heater may be attached to various utensils each of which is provided with a member C and the exchange from one to another is easily effected. The current is supplied to the unit through terminals Q passing radially outward through the casing I and insulated therefrom by bushings R.

What I claim as my invention is:

1. The combination with a heat distributing body having a flat face, of an electrical heater for attachment thereto, comprising an armored heating unit, a backing plate therefor, a casing surrounding said unit and backing plate and spaced therefrom to form an air heat insulating chamber, suspensory means for securing said casing to said unit and backing plate, and clamping means passing through an aperture in said casing and securing said backing plate and armored resistance to said heat distributing body.

2. The combination with a utensil, of a heat absorbing and distributing body secured to said utensil and having a flat face, a flat armored heating unit attached to the flat face of said distributing body, a casing inclosing the heating unit and spaced therefrom forming a heat-insulating chamber, said casing provided with an annular upturned flange in marginal contact with the distributing body, means for clamping said heating unit to said distributing body, and means for attaching said casing to said heating unit.

3. The combination with an electrical heater, comprising an armored heating unit, of a heat absorbing and distributing body other than said unit having a plain face, a backing plate, a hollow cup-shaped casing inclosing said heating unit and spaced therefrom, forming a heat insulating chamber, and means for detachably clamping said heating unit and backing plate to the heat absorbing and distributing body.

In testimony whereof I affix my signature in presence of two witnesses.

FRANK KUHN.

Witnesses:
W. J. BELKNAP,
JAMES P. BARRY.